(12) United States Patent
Nagarajan et al.

(10) Patent No.: US 11,828,995 B2
(45) Date of Patent: Nov. 28, 2023

(54) SILICON PHOTONICS BASED FIBER COUPLER

(71) Applicant: INPHI CORPORATION, Santa Clara, CA (US)

(72) Inventors: Radhakrishnan L Nagarajan, Santa Clara, CA (US); Masaki Kato, Palo Alto, CA (US)

(73) Assignee: MARVELL ASIA PTE LTD, Singapore (SG)

( * ) Notice: Subject to any disclaimer, the term of this patent is extended or adjusted under 35 U.S.C. 154(b) by 401 days.

(21) Appl. No.: 16/995,120

(22) Filed: Aug. 17, 2020

(65) Prior Publication Data

US 2020/0379197 A1    Dec. 3, 2020

Related U.S. Application Data

(63) Continuation of application No. 16/245,076, filed on Jan. 10, 2019, now Pat. No. 10,788,638.

(51) Int. Cl.
*G02B 6/43* (2006.01)
*G02B 6/42* (2006.01)
*G02B 6/122* (2006.01)
*G02B 6/12* (2006.01)

(52) U.S. Cl.
CPC .............. *G02B 6/43* (2013.01); *G02B 6/122* (2013.01); *G02B 6/4206* (2013.01); *G02B 6/4274* (2013.01); *G02B 2006/12061* (2013.01)

(58) Field of Classification Search
CPC ........ G02B 6/43; G02B 6/122; G02B 6/4206; G02B 6/4274; G02B 2006/12061
USPC ........................................................ 385/14
See application file for complete search history.

(56) References Cited

U.S. PATENT DOCUMENTS

2003/0019838 A1 *   1/2003   Shaw ................... G02B 6/4228
                                                           216/20
2020/0158950 A1 *   5/2020   Meade ............... G02B 6/12004

* cited by examiner

*Primary Examiner* — Jerry M Blevins

(57) ABSTRACT

A silicon-based edge coupler for coupling a fiber with a waveguide includes a cantilever member being partially suspended with its anchored end coupled to a silicon photonics die in a first part of a silicon substrate and a free end terminated near an edge region separating a second part of the silicon substrate from the first part. The edge coupler further includes a mechanical stopper formed at the edge region with a gap distance ahead of the free end of the cantilever member. Additionally, a V-groove is formed in the second part of the silicon substrate characterized by a top opening and a bottom plane symmetrically connected by two sloped side walls along a fixed Si-crystallography angle. The V-groove is configured to support a fiber with an end facet being pushed against the mechanical stopper and a core center being aligned with the free end of the cantilever member.

11 Claims, 5 Drawing Sheets

SILICON PHOTONICS BASED FIBER COUPLER

CROSS-REFERENCE TO RELATED APPLICATIONS

This application is a continuation application of and claims priority to U.S. patent application Ser. No. 16/245,076, filed on Jan. 10, 2019, commonly assigned and hereby incorporated by references for all purposes.

BACKGROUND OF THE INVENTION

The present invention relates to silicon photonics techniques. More particularly, the present invention provides a silicon-based edge coupler, a silicon photonics device with a V-groove suspended coupler, a method for making the same.

Over the last few decades, the use of communication networks exploded. In the early days of the Internet, popular applications were limited to emails, bulletin board, and mostly informational and text-based web page surfing, and the amount of data transferred was usually relatively small. Today, Internet and mobile applications demand a huge amount of bandwidth for transferring photo, video, music, and other multimedia files. For example, a social network like Facebook processes more than 500 TB of data daily. With such high demands on data and data transfer, existing data communication systems need to be improved to address these needs.

40-Gbit/s and then 100-Gbit/s data rates wide-band DWDM (Dense Wavelength Division Multiplexed) optical transmission over existing single-mode fiber is a target for the next generation of fiber-optic communication networks. Optical components are being integrated on silicon (Si) substrates for fabricating large-scale photonic integrated circuits. A silicon photonics module can be fabricated as a micro-electronic chip in a form of silicon photonics die on the silicon substrate.

However, it remains a challenge in wafer-level fabrication to couple a fiber with the silicon photonics module. Therefore, improved technique and method of coupling a fiber via an edge coupler with stable fixing structure and reliable alignment are desired.

BRIEF SUMMARY OF THE INVENTION

The present invention relates to optical telecommunication techniques. More particularly, the present invention provides a silicon photonics based edge coupler. Merely by example, the present invention discloses a V-groove suspended coupler formed directly in an edge region of a silicon photonics die fabricated on silicon substrate, though other applications are possible.

In modern electrical interconnect systems, high-speed serial links have replaced parallel data buses, and serial link speed is rapidly increasing due to the evolution of CMOS technology. Internet bandwidth doubles almost every two years following Moore's Law. But Moore's Law is coming to an end in the next decade. Standard CMOS silicon transistors will stop scaling around 5 nm. And the internet bandwidth increases due to process scaling will plateau. But Internet and mobile applications continuously demand a huge amount of bandwidth for transferring photo, video, music, and other multimedia files. This disclosure describes techniques and methods to improve the communication bandwidth beyond Moore's law.

In an embodiment, the present invention provides a silicon-based edge coupler for coupling a fiber with a waveguide. The silicon-based edge coupler includes a waveguide having a cantilever member being partially suspended with its anchored end coupled to a silicon photonics die formed in a first part of a silicon substrate and a free end terminated near an edge region separating a second part of the silicon substrate from the first part. Additionally, the silicon-based edge coupler includes a mechanical stopper formed at the edge region with a gap distance ahead of the free end of the cantilever member. Furthermore, the silicon-based edge coupler includes a V-groove formed in the second part of the silicon substrate to horizontally align with the free end of the cantilever member. The V-groove is characterized by a flat or V-shape bottom plane symmetrically connected by two sloped side walls in a Si-crystallography angle direction ended with a top opening of a specific width. The V-groove is configured to support a fiber with its core center being positioned at a height above the top opening to vertically align with the free end of the cantilever member by selecting the width of the top opening based on a radius of the fiber.

In yet another embodiment, the present invention provides a silicon photonics device configured to couple with one or more fibers. The silicon photonics device includes a silicon substrate configured with a first region and a second region separated by an edge region. Additionally, the silicon photonics device includes a silicon photonics die formed in the first region. The silicon photonics die includes one or more waveguides coupled to the edge region via respective one or more channel regions. A respective one of the one or more waveguides is configured with a cantilever beam with a first end anchored at an inner end of a channel region and a second end suspended at an outer opening of the channel region at the edge region. The silicon photonics device further includes an edge stopper with a straight edge a step ahead of the outer opening of the channel region. Furthermore, the silicon photonics device includes one or more V-grooves formed in the second part of the silicon substrate and horizontally aligned with respective one or more waveguides. A respective one of the one or more V-grooves is characterized by a flat bottom plane symmetrically connected by two sloped side walls in a Si-crystallography angle direction ended with a top opening of a width. The respective one V-groove is configured to support a fiber at the two sloped side walls with its end facet being pushed against the edge stopper and its core center being vertically aligned with the second end of the cantilever beam by the width of the top opening.

In still another embodiment, the present invention provides a method of coupling a fiber to a waveguide in a silicon photonics die. The method includes forming a silicon photonics die in a first region of a silicon substrate. The silicon photonics die has multiple waveguides. A respective one of the multiple waveguides is coupled to an inner end of a channel region extended to an edge region separating a second region from the first region of the silicon substrate. Additionally, the method includes fabricating a cantilever beam along the channel region with a first end anchored at the inner end of the channel region and a second end suspended near the edge region. The method further includes forming an edge stopper along the edge region being positioned a step ahead of the second end of the cantilever beam. Furthermore, the method includes providing a fiber with a radius and a cleaved or curved (in some cases) end facet. The method further includes forming a V-groove in the second region of the silicon substrate with a flat bottom plane symmetrically connected by two sloped side walls in a Si-crystallography angle direction ended with a top opening of a width. The top opening is positioned horizontally with its center aligned with the second end of the cantilever beam and the width selected based on the radius of the fiber. Moreover, the method includes disposing the fiber to the V-groove with the cleaved end facet being pushed against the edge stopper and a core center being at a height above the top opening vertically aligned with the second end of the cantilever beam.

In an alternative embodiment, the present invention provides an optical-electrical module in silicon photonics platform. The optical-electrical module includes a silicon substrate including an edge separating a first region and a second region. Additionally, the optical-electrical module includes one or more edge couplers suspended in the second region with respective ends being short from an edge stopper. The optical-electrical module further includes one or more V-grooves formed in the first region supporting one or more fibers aligned to the respective ends of the one or more edge couplers. The respective one of the one or more V-grooves is characterized by a flat or V bottom plane symmetrically connected by two sloped side walls in a Si-crystallography angle direction ended with a top opening of a width. Furthermore, the optical-electrical module includes a transimpedance amplifier (TIA) module configured as a first flip chip mounted on a front side of the silicon substrate connected to a plurality of through-silicon via interposers in the first region to conductor bumps on a back side of the silicon substrate. The optical-electrical module also includes a driver module configured as a second flip chip with multiple electrodes down-coupled with conductive pads on the front side connected to a plurality of through-silicon via interposers in the first region to conductor bumps on the back side of the silicon substrate. The optical-electrical module further includes a laser device disposed on the front side in the second region of the silicon substrate. Moreover, the optical-electrical module includes a retimer module for mounting the conductor bumps on the back side of the silicon substrate and providing external power as well as internal electrical connections among the laser device, the driver module, and the TIA module.

The present invention achieves these benefits and others in the context of known waveguide laser modulation technology. However, a further understanding of the nature and advantages of the present invention may be realized by reference to the latter portions of the specification and attached drawings.

BRIEF DESCRIPTION OF THE DRAWINGS

The following diagrams are merely examples, which should not unduly limit the scope of the claims herein. One of ordinary skill in the art would recognize many other variations, modifications, and alternatives. It is also understood that the examples and embodiments described herein are for illustrative purposes only and that various modifications or changes in light thereof will be suggested to persons skilled in the art and are to be included within the spirit and purview of this process and scope of the appended claims.

DETAILED DESCRIPTION OF THE INVENTION

The present invention relates to optical telecommunication techniques. More particularly, the present invention provides a silicon-based edge coupler. Merely by example, the present invention discloses a V-groove suspended coupler formed directly in an edge region of a silicon photonics die fabricated on silicon substrate, though other applications are possible.

The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of embodiments. Thus, the present invention is not intended to be limited to the embodiments presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the Claims herein is not intended to invoke the provisions of 35 U.S.C. 112, Paragraph 6.

Please note, if used, the labels left, right, front, back, top, bottom, forward, reverse, clockwise and counter clockwise have been used for convenience purposes only and are not intended to imply any particular fixed direction. Instead, they are used to reflect relative locations and/or directions between various portions of an object.

Figure 1:
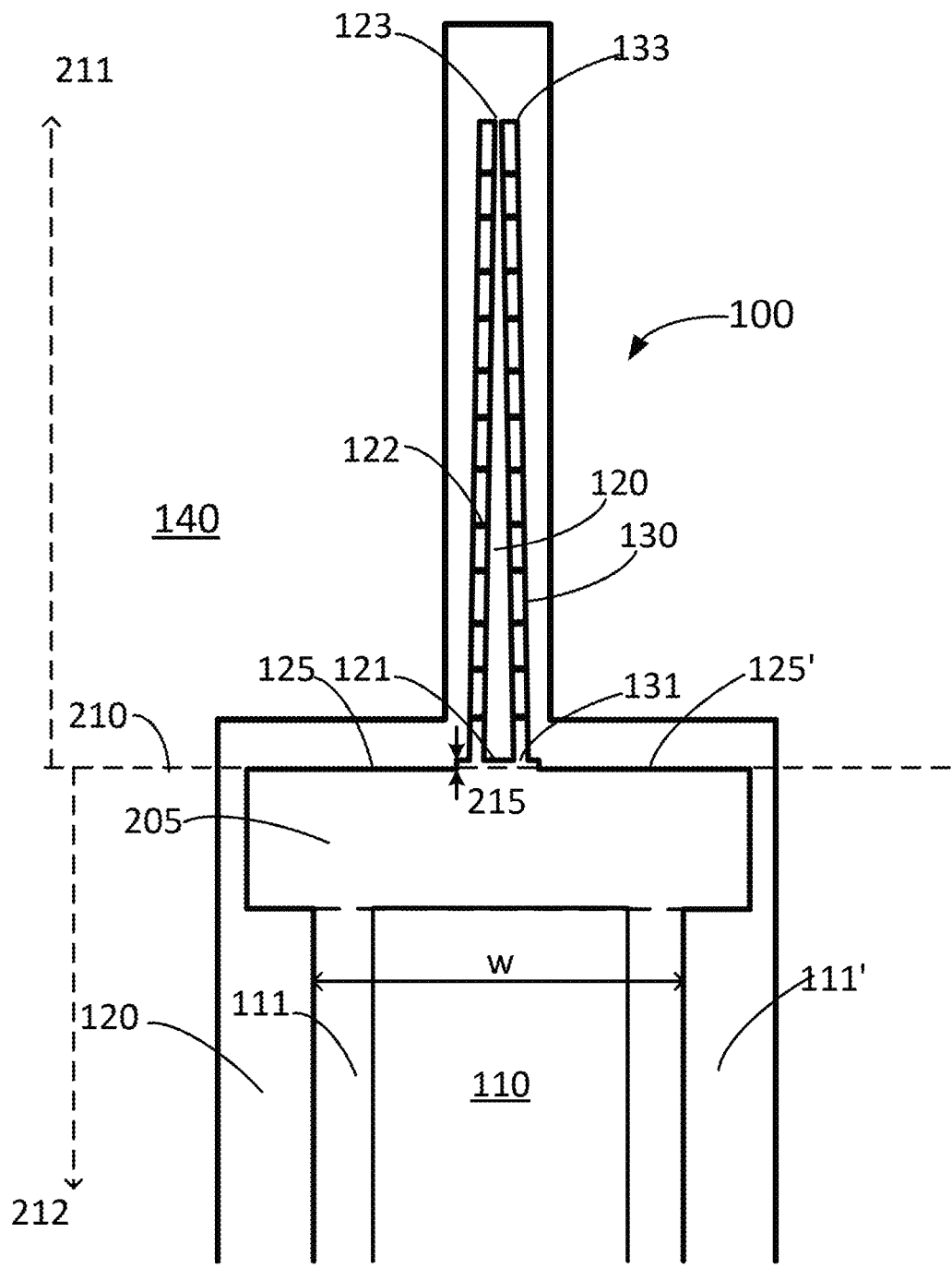
FIG. 1 is a simplified diagram of a silicon-based edge coupler according to an embodiment of the present invention.

FIG. 1 is a simplified diagram of a silicon-based edge coupler according to an embodiment of the present invention. This diagram is merely an example, which should not unduly limit the scope of the claims. One of ordinary skill in the art would recognize many variations, alternatives, and modifications. As shown, a silicon-based edge coupler 100 is an intrinsic structure formed around an edge region of a silicon photonics die 140. Optionally, the silicon photonics die 140 is a silicon photonics (SiPho) module containing multiplexer, demultiplexer, modulator, polarization rotator or combiner, coupler/splitter, waveguides, or other optical devices substantially integrated in a same silicon substrate. Optionally, either an input or an output port of the SiPho module need one or more couplers to coupler the waveguides built in the silicon substrate with one or more optical fibers.

In this embodiment, the edge coupler 100 includes a silicon suspended structure directly formed in the same silicon substrate, in which the SiPho module is formed, to extend a silicon waveguide (not explicitly shown) from deep area in the first part 211 of the silicon substrate to an edge line 210. The edge line 210 is schematically provided to separate a second part 212 of the silicon substrate from the first part 211. Referring to FIG. 1, the suspended structure is formed within a channel region 130 with an elongated shape from an inner end 133 inside the first part 211 of the silicon substrate extended along a direction substantially perpendicular to the edge line 210 to an outer opening 131. Optionally, the suspended structure includes a cantilever member 120 suspended along the channel region 130. An anchored end 123 of the cantilever member 120 is joined with an inner end 133 of the channel region 130, A free end 121 is leveled to the outer opening 131 of the channel region 130 facing the second part 212 of the silicon substrate. Optionally (also shown in FIG. 1), the cantilever member 120 is partially suspended as many discrete sites along two sides of the cantilever member 20 are linked to respective sites along two sides of the channel region 130 by multiple micro bridges 122. Of course, other micro links structure can be used for realizing a partial suspension while stabilizing the cantilever member 120. Optionally, the cantilever member 120 is taper shaped with the free end 121 being made wider than that of the anchored end 123. Of course, detail geometrical shape can be modified with an aim to achieve highest coupling efficiency from a fiber to the waveguide or vice versa.

In the embodiment, the edge coupler 100 further includes a mechanical stopper 125 formed at the edge region with a gap distance 215 ahead of the free end 121 of the cantilever member 120. Referring to FIG. 1, the mechanical stopper is an edge facet along the edge line 210. Optionally, the mechanical stopper is a pair of edge facets 125 and 125' respectively formed along the edge line extended out to two opposite directions of the out opening 131 with a small gap distance 215 ahead of the free end 121 of the cantilever member 120. In other words, the free end 121 is a little shorter by the gap distance 215 to reach the edge line 210. Optionally, the mechanical stopper 125/125' is used to prevent potential damage to the cantilever member 120 caused by a fiber to be coupled with the waveguide.

Further in the embodiment, the edge coupler 100 includes a V-groove structure formed in the second part 212 of the same silicon substrate. Referring to the top view shown in FIG. 1, the V-groove structure is characterized by a flat bottom plane 112 extended symmetrically upward with two sloped side walls 111 and 111' ended with a top opening of a width w. The top opening is leveled with a plane 120. Optionally, depending on a size (radius) of a fiber the two side walls 111 and 111' are set to support the fiber body optionally without touching the flat bottom plane 110 or could be also designed to touch at the bottom. Optionally, the V-groove structure is formed in the second part 212 of the silicon substrate to allow a symmetric central line to be horizontally aligned with a center of the free end 121 of the cantilever member 120. This is very achievable by precise photolithography. More details about holding fiber in the V-groove and align the fiber to the free end of the cantilever member are further illustrated throughout the specification and particularly below in FIG. 2. Optionally, a buffer region 205 is provided between the V-groove structure and the edge line 210 to provide some rooms for overflows of epoxy material for fixing the fiber into the V-groove.

Figure 2:
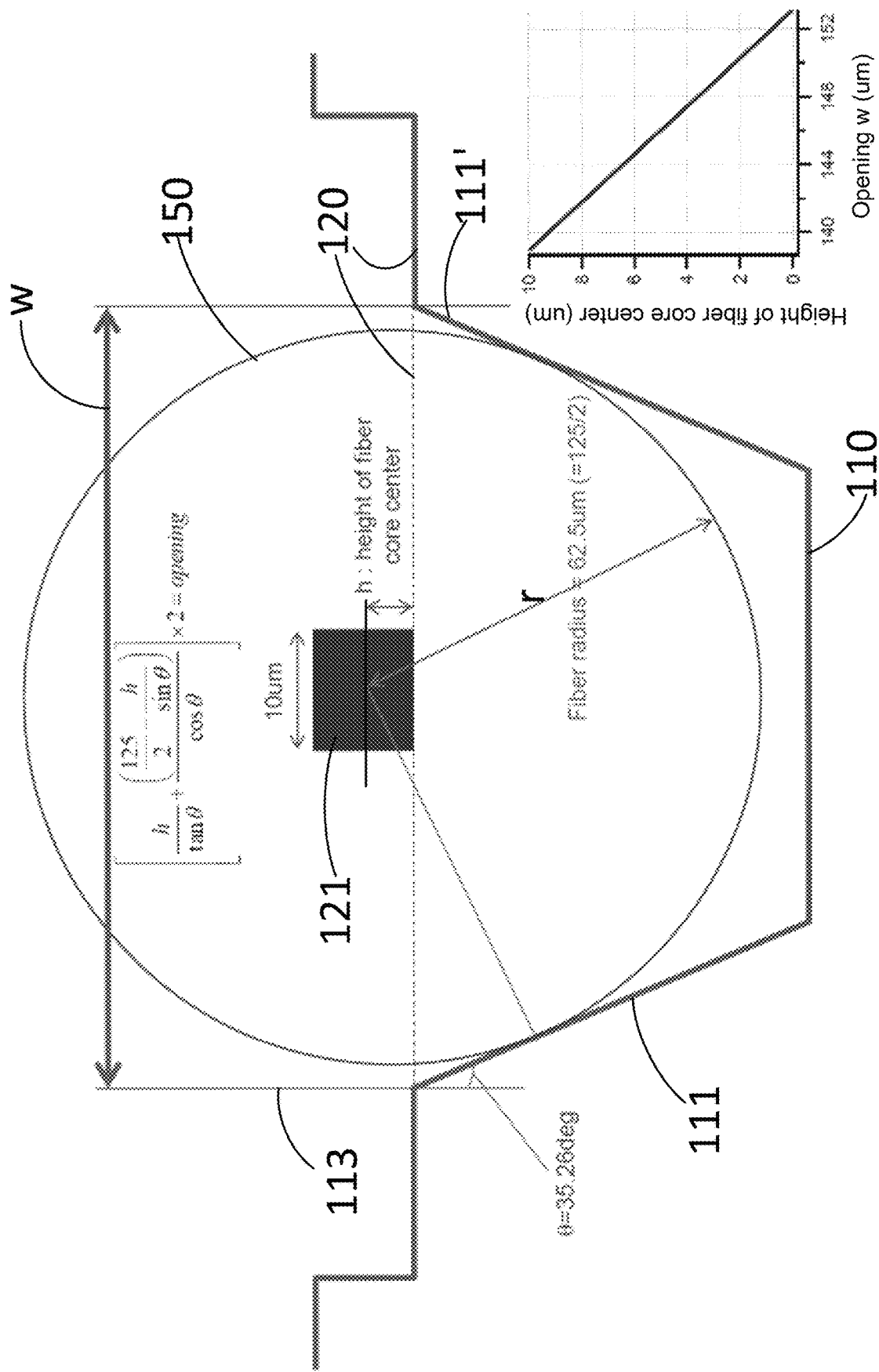
FIG. 2 is a schematic diagram showing a side view of a V-groove supporting a fiber according to an embodiment of the present invention.

FIG. 2 is a schematic diagram showing a side view of a V-groove supporting a fiber according to an embodiment of the present invention. This diagram is merely an example, which should not unduly limit the scope of the claims. One of ordinary skill in the art would recognize many variations, alternatives, and modifications. Referring to FIG. 2, in a specific embodiment, the V-groove structure is characterized by a flat bottom plane 110 symmetrically connected by two sloped side walls 111 and 111' in a specific direction with an angle θ relative to a vertical direction 113 (perpendicular to the plane 120 that is leveled with the top opening). The angle θ is chosen to be a Si-crystallography angle between two primary crystal planes of silicon. For example, the angle θ is fixed at 35.26 deg. Provided a silicon substrate with a surface in (100) plane, an anisotropic etching can be performed with an etch stop set at {111} plane to form the two side walls 111/111'. Based on Si-crystallography the angle between (100) and (111) is 54.74 deg, so the angle θ is fixed at 35.26 deg.

Provided with a fixed angle θ and the V-groove is central aligned with the free end 121 of the cantilever member 120, the center of the free end 121, assuming to be a rectangular shape, is set to a height h above the top opening line 120 of the V-groove. When a fiber 150 of a radius r is disposed into the V-groove, the fiber body 150 will be supported by the two sloped side walls 111/111'. While the height h will be different if the width of the top opening w is set differently. Assuming the fiber radius r=125/2=62.5 μm, a formula giving the relationship between h and w has been shown in FIG. 2, i.e., $[h/\tan \theta + (125/2 - h/\sin \theta)/\cos \theta]2 = w$. In lower right part of FIG. 2, a plot of the height h of fiber core center versus the opening width w is shown with a negative linear relationship. Basically, a selection of the width w of the top opening solely determines the height of the fiber core above the top opening line which can be used for vertically aligning the core center of the fiber 150 loaded in the V-groove with the free end 121 of the cantilever member formed in the silicon substrate to realize fiber to waveguide coupling. Because photolithography can define horizontal alignment of the top opening very precisely, so does the width of the top opening. The top opening width w of the V-groove determines the vertical alignment of the optical fiber.

Figure 3:
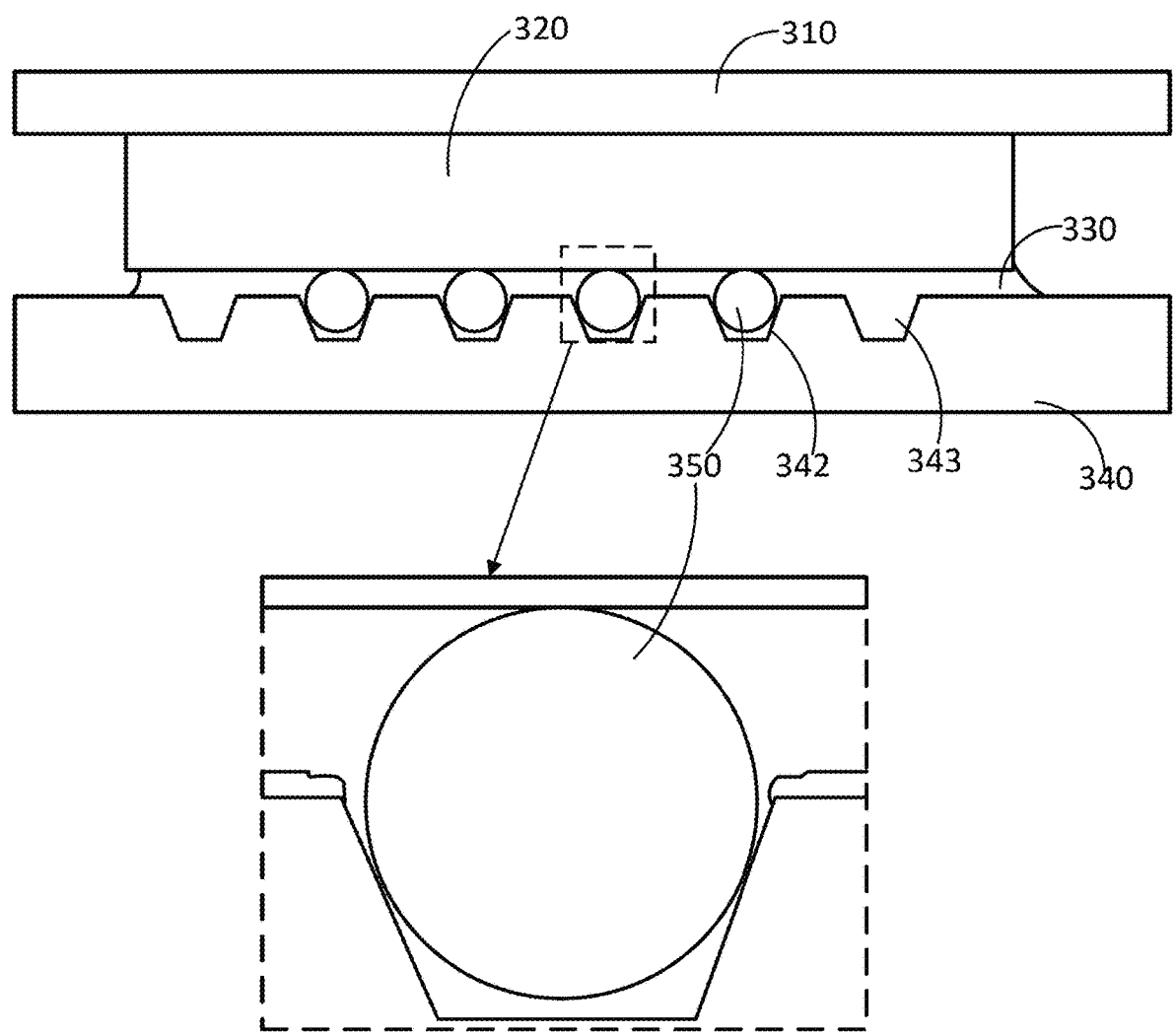
FIG. 3 is an exemplary diagram of a silicon photonics device coupled with four fibers through an array of V-groove edge couplers according to an embodiment of the present invention.

FIG. 3 is an exemplary diagram of a silicon photonics device coupled with four fibers through an array of V-grooves edge couplers according to an embodiment of the present invention. This diagram is merely an example, which should not unduly limit the scope of the claims. One of ordinary skill in the art would recognize many variations, alternatives, and modifications. Referring to FIG. 3, a silicon photonics (SiPho) module is packaged with four fibers 350 being loaded into respective four V-grooves 342 (to couple with respective four suspended waveguide cantilevers that are not seen in this Figure) formed in the silicon substrate 340. Once each fiber 350 is in place inside the respective one V-groove 342, epoxy material 343 is added to securely fix the fiber 350 in position (assuming the alignment has been conducted by passively moving the fiber end facet until it makes contact with the edge stopper 125 of the Si substrate 140). In an embodiment, for the silicon photonics device configured to couple multiple fibers to multiple waveguides in the silicon substrate, the silicon-based edge coupler 100 (FIG. 1) including a suspended cantilever beam 120 and a V-groove for supporting the fiber with its end facet being stopped at the mechanical edge stopper 125 can be repeated implemented to form multiple edge couplers 100 in an array, as seen in FIG. 1 and FIG. 3. In the embodiment, the array of V-grooved associated with the array of edge couplers are formed with a pair of dummy V-grooves 343 respectively added to two outermost locations of the array. The added dummy V-groove 343 is configured to prevent epoxy to flow over critical area of the SiPho module.

Referring to FIG. 3, the SiPho module package of coupling the four fibers to silicon waveguides via V-grooves 342 also includes a plate 320 for containing the fibers in respective V-grooves 342 as well as the epoxy material 330 between the plate 320 and the silicon substrate 340. A package coupler 310 is topped over the plate 320.

Figure 4:
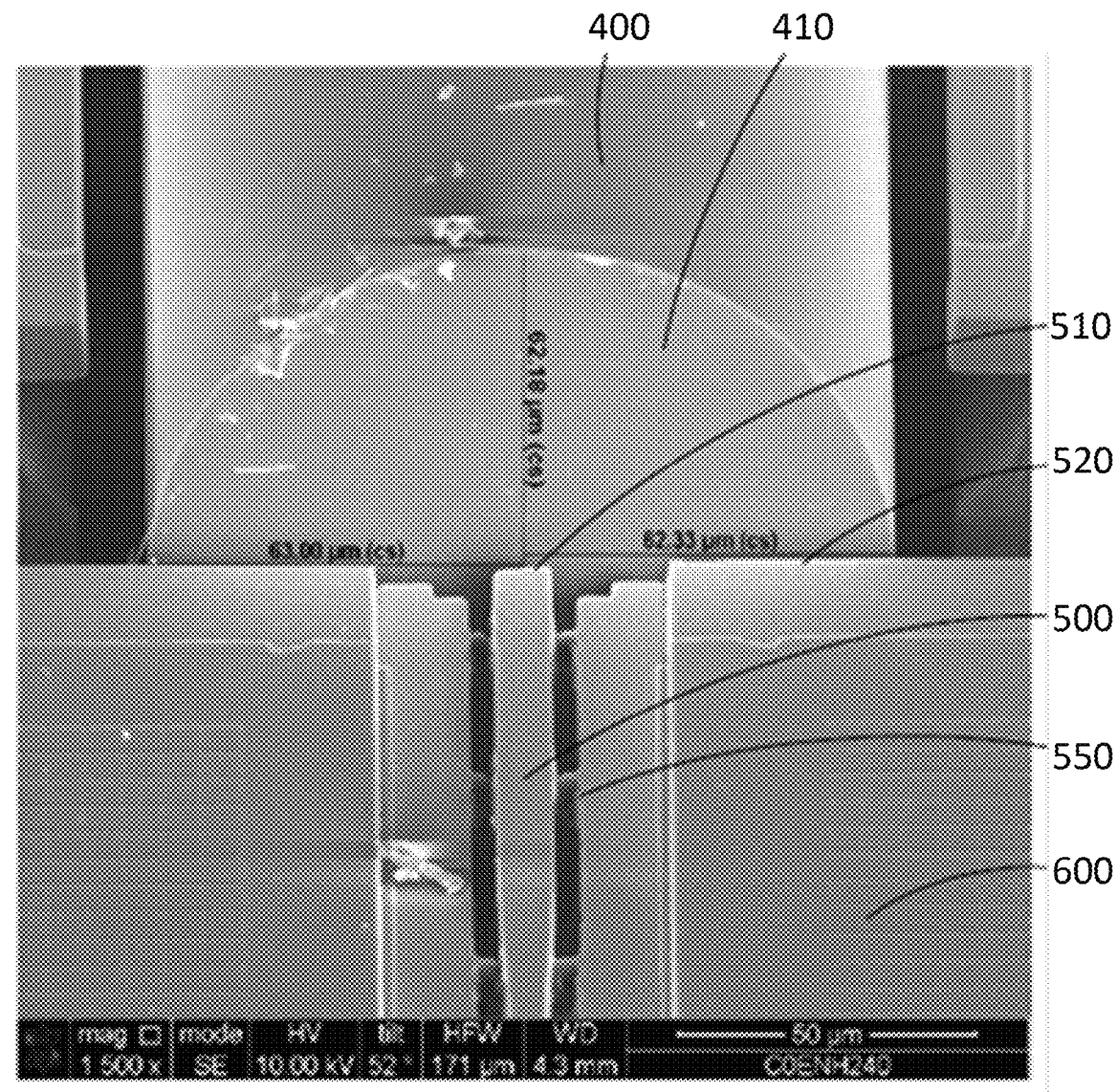
FIG. 4 is an exemplary electron microscopy image of a fiber coupled with Si-based edge coupler in a silicon photonics die according to another embodiment of the present invention.

FIG. 4 is an exemplary electron microscopy image of a fiber coupled with Si-based edge coupler in a silicon photonics die according to another embodiment of the present invention. This diagram is merely an example, which should not unduly limit the scope of the claims. One of ordinary skill in the art would recognize many variations, alternatives, and modifications. As shown in a perspective view, a fiber 400 of a radius r~62.5 µm is disposed in V-groove (not explicitly visible) with its end facet 410 being pushed against to mechanical stopper 520 of the silicon-based edge coupler. The silicon-based edge coupler is formed directly in the silicon substrate 600 with a cantilever beam 500 being fabricated in a channel region. The cantilever beam is partially suspended as multiple micro bridges 550 are formed along two sides of the cantilever beam to connect with respective sites along two sides of the channel region. More specifically, a free end 510 of the cantilever beam 500 is held a little shorter to avoid being directly hit by the end facet 410 of the fiber. Yet, a gap distance between the free end 510 of the cantilever beam 500 can be set to in a range of about 0.1 µm to a few microns, ensuring high efficiency of optical coupling between the fiber and the silicon waveguide cantilever yet avoiding any physical damage to the free end 510 of the cantilever beam 500.

In another aspect, the present disclosure also provides a method for coupling a fiber to a waveguide in a silicon photonics die. In an embodiment, the method includes a step of forming a silicon photonics die in a first region of a silicon substrate. The silicon photonics die has multiple waveguides. A respective one of the multiple waveguides is coupled to an inner end of a channel region extended to an edge region. Nominally, the channel region is formed substantially perpendicular to an edge facet of the edge region. The edge region, or particularly the edge facet geometrically separates a second region of the silicon substrate from the first region of the silicon substrate.

Further, the method includes a step of fabricating a cantilever beam along the channel region with a first end anchored at the inner end of the channel region and a second end suspended near the edge region. Optionally, the step of fabricating the cantilever beam is performed substantially the same time of forming a channel region from the edge region into the first region of the silicon substrate. Optionally, the cantilever beam is partially suspended in the middle of the channel region with multiple side bridges connected respective multiple sites at the cantilever beam and sites along the sides of the channel region. Particularly, the second end of the cantilever beam is suspended substantially free from contact of any other part of the silicon substrate and is made slightly shorter to be leveled with the edge facet outside the channel region. Optionally, a gap distance of about 0.1 to 5 µm can be defined with precise photolithography process.

Additionally, the method includes a step of forming an edge stopper along the edge region being positioned a step ahead of the second end of the cantilever beam. In fact, the step is substantially to make the suspended end to be the gap distance shorter to be leveled with the edge facet. The same step makes the edge facet to be the edge stopper. Optionally, forming the edge stopper also providing a buffer region beyond a larger distance from the edge facet.

The method further includes a step of providing a fiber with a radius and a cleaved end facet. The fiber is selected to couple with the waveguide via the suspended end of the cantilever beam. A knowledge about the radius of the fiber will be used for configuring a respective V-groove aligned with the respective suspended end of the cantilever beam. Optionally, the fiber is cleaved with a polished end facet being formed. Optionally, the end facet is substantially perpendicular to fiber core. The fiber may have an angled polish as well.

Furthermore, the method includes a step of forming a V-groove in the second region of the silicon substrate with a flat bottom plane symmetrically connected by two sloped side walls in a Si-crystallography angle direction ended with a top opening of a width. The top opening is positioned horizontally with its center aligned with the second end of the cantilever beam and the width of the top opening is selected based on the radius of the fiber. In a specific embodiment, the Si-crystallography angle is fixed at 35.26 degrees if the surface of the silicon substrate is (100) plane and two slopped side walls are at {111} planes. This makes the width of the (top opening) V-groove is a sole factor to determine a vertical height of a fiber core center above the top opening of the V-groove being aligned with a center position of the suspended end of the cantilever beam. The height of the core center of the fiber above the plane leveled with the top opening is negatively linearly depended upon the width of the top opening.

Moreover, the method includes a step of disposing the fiber (with known radius) to the V-groove with the cleaved or curved end facet being pushed against the edge stopper and a core center being at a height above the top opening vertically aligned with the second end of the cantilever beam. If the width of the top opening of the V-groove is made when performing the step of forming the V-groove, the core center of the fiber will be aligned properly with the suspended end of the cantilever beam for enabling high efficiency optical coupling between the fiber and the waveguide associated with the silicon photonics die.

In the embodiment, the method further includes forming multiple V-grooves in an array parallel to each other in the second region of the silicon substrate. A respective one of the multiple V-grooves is aligned with one cantilever beam associated with the respective one of multiple waveguides. At least two V-grooves at two outermost locations of the array are used as dummy V-grooves for preventing epoxy overflown to the silicon photonics die.

Figure 5:
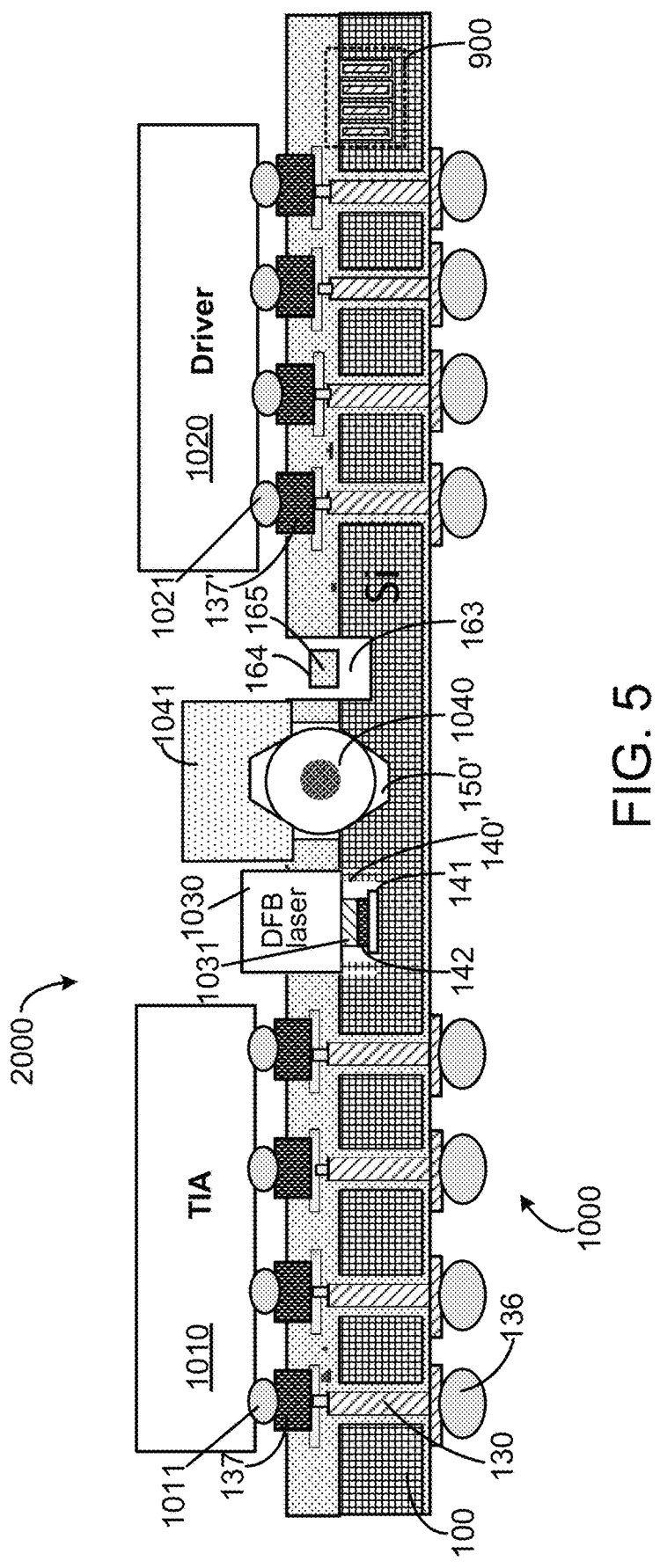
FIG. 5 is a schematic sectional view of an optical-electrical module based on the silicon photonics platform coupled with an optical fiber via the V-groove edge coupler according to an embodiment of the present invention.

In another aspect, the present disclosure provides an optical-electrical module based on silicon photonics platform having at least an optical fiber coupled with the module via the V-groove edge coupler described herein. FIG. 5 shows a schematic diagram of an optical-electrical module in cross-sectional view. As shown, an optical-electrical module based on the silicon photonics TSV interposer according to an embodiment of the present invention. As shown, the optical-electrical module 2000 includes a silicon substrate 100 including a front side and a back side and a plurality of through-silicon vias (TSVs) 130 formed in a first region of the silicon substrate 100. Each TSV 130 is configured to fill a conductor material ended with a pad 137 at the front side and a bump 136 at the back side. The optical-electrical module 2000 further includes one or more edge couplers 164 (e.g., substantially the same one shown in FIG. 1) with an end 165 being short from an edge stopper suspended over a cavity 163 in the front side. The edge stopper (not explicitly visible in this cross-sectional view) is substantially leveled with an edge separating the first region from a second region of the silicon substrate 100. The cavity 163 is formed in a second region isolated from the first region after the plurality of TSVs 130 including the pads 137 and the bumps 136 is formed. Additionally, the optical-electrical module 2000 includes a laser device 1030 disposed in a trench 140' in the second region of the front side. Optionally, the laser device 1030 is a DFB laser having at least an electrode 1031 coupled directly with a solder pad 142 on an under-bump metallization structure 141 in the trench 140'. Furthermore, the optical-electrical module 2000 includes one or more fibers 1040 installed in respective one or more V-grooves 150' (one is shown schematically in FIG. 5) in the second region of the front side. The one or more fibers 1040 is configured to couple with the one or more edge couplers 164 and the laser device 1030. Note, in this view angle, if a fiber 1040 is coupled with a corresponding edge coupler 164, the edge coupler 164 is blocked by the fiber 1040 from the direct view. Optionally, the one or more fibers 1040 is fixed in the one or more V-grooves 150' by a lid 1041.

Moreover, the optical-electrical module 2000 includes one or more electrical IC chips having electrodes coupled directly with some pads 137 at the front side of the silicon photonics TSV interposer that electrically connected to some bumps 136 at the back side through the conductive material in the plurality of TSVs 130. Optionally, the one or more electrical IC chips include a transimpedance amplifier (TIA) module 1010. Optionally, the TIA module is a flip chip having electrodes 1011 facing directly towards some conductive pads 137 on the front side of the silicon photonics TSV interposer to form direct electrical connection without any wirebonds. Optionally, the one or more electrical IC chips include a driver module 1020 configured as a flip chip with multiple electrodes 1021 facing directly towards some other conductive pads 130' on the front side of the silicon photonics TSV interposer to form direct electrical connection without any wirebonds. Optionally, the optical-electrical module 2000 further includes multiple multi-layer capacitors formed in the front side of the silicon photonics TSV interposer. Optionally, the optical-electrical module 2000 can be applied as an on-board module coupled together with a gear box or retimer module. The on-board module is then mounted with a switch on a same PCB and connected to an optical connector via a fiber to connect to external optical network and very-short reach (VSR) electrical interface for communicating with electrical network for data center switch application.

While the above is a full description of the specific embodiments, various modifications, alternative constructions and equivalents may be used. Therefore, the above description and illustrations should not be taken as limiting the scope of the present invention which is defined by the appended claims.

What is claimed is:

1. A silicon photonics module comprising:
a silicon photonics die disposed on a substrate, the silicon photonics die comprising a waveguide; and
an optical coupler disposed along an edge of the silicon photonics die, the optical coupler extending from the edge of the silicon photonics die inwards towards the waveguide disposed in the silicon photonics die, the optical coupler narrowing in size from the edge of the silicon photonics die towards the waveguide,
wherein the optical coupler comprises a cantilever structure suspended in a channel formed in the silicon photonics die, the cantilever structure having a free end adjacent to the edge of the silicon photonics die and an anchored end disposed adjacent to the waveguide.

2. The silicon photonics module of claim 1 wherein the optical coupler is configured to couple the waveguide to an optical fiber that is mountable adjacent to the edge of the silicon photonics die.

3. The silicon photonics module of claim 2 wherein the waveguide has a smaller diameter than the optical fiber, and wherein the optical coupler narrows in size from the optical fiber to the waveguide to couple the optical fiber to the waveguide.

4. The silicon photonics module of claim 1 wherein the cantilever structure is tapered with the free end being wider than the anchored end.

5. The silicon photonics module of claim 1 wherein the cantilever structure is linked to the channel by a plurality of micro bridges disposed on either sides of the cantilever structure between the cantilever structure and the channel.

6. The silicon photonics module of claim 1 further comprising a stopper disposed at the edge of the silicon photonics die wherein the free end of the cantilever structure is recessed inwardly from the edge of the silicon photonics die to provide a gap between the stopper and the stopper and the free end of the cantilever structure to prevent damage from the optical fiber to the cantilever structure.

7. The silicon photonics module of claim 1 further comprising a groove disposed in the substrate to support the optical fiber, the groove being adjacent to edge of the silicon photonics and opposite to the free end of the cantilever structure.

8. The silicon photonics module of claim 7 wherein the groove is configured to align a center of the optical fiber to a center of the free end of the cantilever structure.

9. The silicon photonics module of claim 7 wherein the groove is configured to align centers of the optical fiber, the free and anchored ends of the cantilever structure, and the waveguide.

10. The silicon photonics module of claim 7 wherein the groove is V-shaped.

11. The silicon photonics module of claim 7 further comprising a cover disposed over the optical fiber and a bonding material disposed in the groove to secure the optical fiber in the groove.

* * * * *